(12) United States Patent
Wang et al.

(10) Patent No.: US 10,339,023 B2
(45) Date of Patent: Jul. 2, 2019

(54) CACHE-AWARE ADAPTIVE THREAD SCHEDULING AND MIGRATION

(71) Applicant: Intel Corporation, Santa Clara, CA (US)

(72) Inventors: Ren Wang, Portland, OR (US); Tsung-Yuan C. Tai, Portland, OR (US); Paul S. Diefenbaugh, Portland, OR (US); Andrew J. Herdrich, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 14/496,216

(22) Filed: Sep. 25, 2014

(65) Prior Publication Data

US 2016/0092363 A1    Mar. 31, 2016

(51) Int. Cl.
*G06F 12/084* (2016.01)
*G06F 11/30* (2006.01)
(Continued)

(52) U.S. Cl.
CPC ........ *G06F 11/3037* (2013.01); *G06F 1/3206* (2013.01); *G06F 1/3275* (2013.01);
(Continued)

(58) Field of Classification Search
CPC .......... G06F 12/08; G06F 11/34; G06F 11/30; G06F 9/4856; G06F 9/50888; G06F 12/084
See application file for complete search history.

(56) References Cited

U.S. PATENT DOCUMENTS 5,163,153 A   11/1992   Cole et al.
5,522,087 A    5/1996   Hsiang
(Continued)

FOREIGN PATENT DOCUMENTS

EP   1 282 030 A1    5/2003
EP   2 336 892       6/2011
WO   WO 2012136766  10/2012

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.
(Continued)

*Primary Examiner* — Nicholas J Simonetti
(74) *Attorney, Agent, or Firm* — Trop, Pruner & Hu, P.C.

(57) ABSTRACT

In one embodiment, a processor includes: a plurality of cores each to independently execute instructions; a shared cache memory coupled to the plurality of cores and having a plurality of clusters each associated with one or more of the plurality of cores; a plurality of cache activity monitors each associated with one of the plurality of clusters, where each cache activity monitor is to monitor one or more performance metrics of the corresponding cluster and to output cache metric information; a plurality of thermal sensors each associated with one of the plurality of clusters and to output thermal information; and a logic coupled to the plurality of cores to receive the cache metric information from the plurality of cache activity monitors and the thermal information and to schedule one or more threads to a selected core based at least in part on the cache metric information and the thermal information for the cluster associated with the selected core. Other embodiments are described and claimed.

20 Claims, 15 Drawing Sheets

(51) Int. Cl.
  *G06F 11/34* (2006.01)
  *G06F 12/0895* (2016.01)
  *G06F 1/3206* (2019.01)
  *G06F 1/3234* (2019.01)
  *G06F 1/3287* (2019.01)

(52) U.S. Cl.
  CPC ........ *G06F 1/3287* (2013.01); *G06F 11/3024* (2013.01); *G06F 11/3058* (2013.01); *G06F 11/3409* (2013.01); *G06F 11/3433* (2013.01); *G06F 12/084* (2013.01); *G06F 12/0895* (2013.01); *G06F 11/3062* (2013.01); *G06F 11/348* (2013.01); *G06F 2201/81* (2013.01); *G06F 2201/88* (2013.01); *G06F 2201/885* (2013.01); *Y02D 10/13* (2018.01); *Y02D 10/14* (2018.01); *Y02D 10/171* (2018.01); *Y02D 10/24* (2018.01); *Y02D 10/34* (2018.01)

(56) References Cited

U.S. PATENT DOCUMENTS

| | | |
|---|---|---|
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,002 B1* | 10/2008 | Zedlewski .......... G06F 11/3409 711/130 |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0068730 A1* | 4/2004 | Miller .................... G06F 9/485 718/106 |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2005/0240735 A1* | 10/2005 | Shen .................. G06F 12/0831 711/144 |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0198863 A1* | 8/2007 | Bose ...................... G06F 1/206 713/300 |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2009/0328055 A1* | 12/2009 | Bose .................... G06F 1/3203 718/105 |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2011/0219190 A1 | 9/2011 | Ng et al. |
| 2011/0246995 A1* | 10/2011 | Fedorova .............. G06F 9/5033 718/103 |
| 2012/0079290 A1 | 3/2012 | Kumar |
| 2012/0166731 A1 | 6/2012 | Maciocco et al. |
| 2012/0246506 A1 | 9/2012 | Knight |
| 2012/0254643 A1 | 10/2012 | Fetzer et al. |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2014/0068290 A1 | 3/2014 | Bhandaru et al. |
| 2014/0173206 A1 | 6/2014 | Wang et al. |
| 2014/0173207 A1 | 6/2014 | Wang et al. |
| 2015/0007187 A1* | 1/2015 | Shows .................. G06F 9/5088 718/104 |

OTHER PUBLICATIONS

SPEC—Power and Performance, Design Overview V1.10, Standard Performance Information Corp., Oct. 21, 2008, 6 pages.
Intel Technology Journal, "Power and Thermal Management in the Intel Core Duo Processor," May 15, 2006, pp. 109-122.
Anoop Iyer, et al., "Power and Performance Evaluation of Globally Asynchronous Locally Synchronous Processors," 2002, pp. 1-11.
Greg Semeraro, et al., "Hiding Synchronization Delays in A GALS Processor Microarchitecture," 2004, pp. 1-13.
Joan-Manuel Parcerisa, et al., "Efficient Interconnects for Clustered Microarchitectures," 2002, pp. 1-10.
Grigorios Magklis, et al., "Profile-Based Dynamic Voltage and Frequency Scalling for a Multiple Clock Domain Microprocessor," 2003, pp. 1-12.
Greg Semeraro, et al., "Dynamic Frequency and Voltage Control for a Multiple Clock Domain Architecture," 2002, pp. 1-12.
Greg Semeraro, "Energy-Efficient Processor Design Using Multiple Clock Domains with Dynamic Voltage and Frequency Scaling," 2002, pp. 29-40.
Diana Marculescu, "Application Adaptive Energy Efficient Clustered Architectures," 2004, pp. 344-349.
L. Benini, et al., "System-Level Dynamic Power Management," 1999, pp. 23-31.
Ravindra Jejurikar, et al., "Leakage Aware Dynamic Voltage Scaling for Real-Time Embedded Systems," 2004, pp. 275-280.
Ravindra Jejurikar, et al., "Dynamic Slack Reclamation With Procrastination Scheduling in Real-Time Embedded Systems," 2005, pp. 13-17.
R. Todling, et al., "Some Strategies for Kalman Filtering and Smoothing," 1996, pp. 1-21.
R.E. Kalman, "A New Approach to Linear Filtering and Prediction Problems," 1960, pp. 1-12.
International Application No. PCT/US2012/028865, filed Mar. 13, 2012, entitled "Providing Efficient Turbo Operation of a Processor," by Intel Corporation.
International Application No. PCT/US2012/028902, filed Mar. 13, 2012, entitled "Dynamically Controlling Interconnect Frequency in a Processor," by Intel Corporation.

(56) References Cited

OTHER PUBLICATIONS

International Application No. PCT/US2012/028876, filed Mar. 13, 2012, entitled "Dynamically Computing an Electrical Design Point (EDP) for a Multicore Processor," by Intel Corporation.
Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.
Intel Corporation, Peggy Irelan and Shihjong Kuo "Performance Monitoring Unit Sharing Guide," Date Unknown, 13 pages.

* cited by examiner

CACHE-AWARE ADAPTIVE THREAD SCHEDULING AND MIGRATION

BACKGROUND

Processor power dissipation has become an issue for processors of all types, from low end mobile processors to high end server processors. Among processor components, a cache memory is a major portion of a processor's area and transistor counts, and consumes significant leakage power. For example, for a typical commercially available multicore processor, 40% of total leakage power is due to a last level cache (LLC) and interconnect.

While reducing a cache's leakage power by turning off portions of a cache memory may reduce processor power consumption, it is practically difficult to turn off even portions of a LLC as it is typically implemented as a shared memory structure in which a portion of all memory addresses of a system is statically mapped to each LLC portion. As such, even if one core of a multicore processor is operating, all LLC slices are active to service memory requests mapped to the slices. And thus there are limited power saving opportunities for this type of cache memory in many current processors.

A clustered (non-uniform) LLC organization may provide power management and performance benefits. In a clustered LLC, each LLC cluster only holds data for its associated core(s). As such, hit latency and interconnect traffic are reduced. Moreover, when the cores associated with a cluster enter a low power state, the LLC cluster does not have to service any active cores associated with other clusters. And thus the cluster associated with the low power core(s) can be potentially flushed and turned off to save significant leakage power. But inefficiencies still exist due to sub-optimal scheduling.

DETAILED DESCRIPTION

Figure 1:
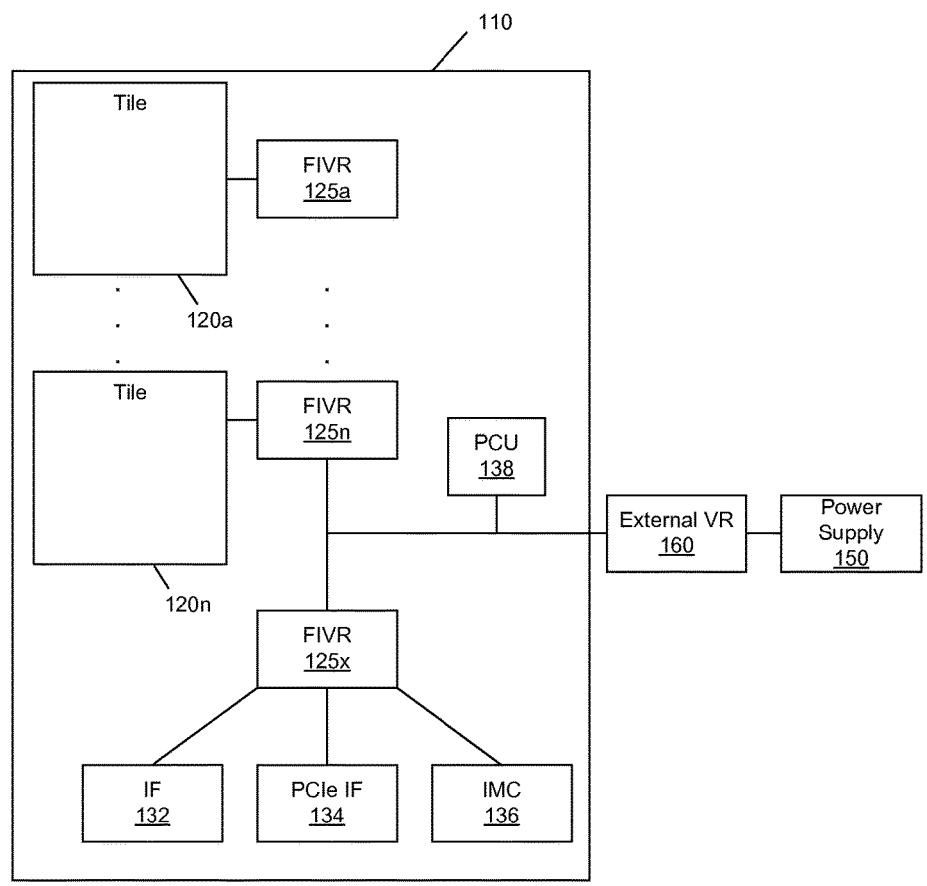
FIG. 1 is a block diagram of a portion of a system in accordance with an embodiment of the present invention.

In various embodiments, a multicore processor such as a multi-tile chip multiprocessor (CMP) may be provided with a multi-level cache memory hierarchy. In this hierarchy each of the levels of cache memory may be arranged as private portions each associated with a given core (or a cluster of cores) or other caching agent. In this way, a private (or clustered) cache organization is realized to allow embodiments to enable local LLC portions or slices associated with a caching agent to be dynamically power gated in certain circumstances. As will be described herein, this dynamic power gating of an LLC slice may occur when at least one of the following situations is present: (i) the associated core is in a low power state (such as a given sleep state); and (ii) a lower cache level in the hierarchy (e.g., a mid-level cache (MLC)) provides sufficient capacity for execution of an application or other workload running on the core. In this way, total chip power may be significantly reduced. Although the embodiments described herein are with regard to power gating of a LLC, understand that in other embodiments a different level of a multi-level cache hierarchy can be power gated.

In addition, embodiments may adaptively schedule multiple threads among different clusters of a processor cache architecture to balance power, performance and thermal considerations. Such adaptive scheduling may achieve greater performance and power savings as compared to a naïve consolidation or scheduling of many threads in one cluster or tile, which may include one or more cores and associated cache storage. While naïve scheduling may allow other clusters to be power gated (saving platform power), doing so may negatively impact performance due to cache contention, in turn slowing down execution and potentially incurring a negative energy impact. This is so, as threads vary in terms of cache capacity requirements. Without proper scheduling, certain negative effects may occur: performance may be negatively impacted due to excessive cache contention when too many threads are contenting for limited cache capacity; a thermal issue may result when cores run at high frequency for a long time; and increased power consumption as a result of performance degradation, since applications may take a longer time to finish, and thus the platform is powered on for longer execution time.

Thus embodiments provide an architecture and methods to schedule/migrate threads adaptively and intelligently to achieve optimal balance among performance, power and thermal considerations, in light of the underlying non-uniform cache structure (e.g., clustered LLC organization). While embodiments described herein are in the context of a clustered LLC of a single semiconductor die such as of a multi-core processor or system on chip (SoC), other embodiments apply to processors with multiple sockets, where each socket can be viewed as one cluster, and/or to a multi-node server architecture where each node is a cluster.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple tiles $120_a$-$120_n$. Each tile includes a processor core and an associated private cache memory hierarchy that, in some embodiments is a three-level hierarchy with a low level cache, a MLC and an LLC. In addition, each tile may be associated with an individual voltage regulator $125_a$-$125_n$. Accordingly, a fully integrated voltage regulator (FIVR) implementation may be provided to allow for fine-grained control of voltage and thus power and performance of each individual tile. As such, each tile can operate at an independent voltage and frequency, enabling great flexibility and affording wide opportunities for balancing power consumption with performance. Of course, embodiments apply equally to a processor package not having integrated voltage regulators.

Still referring to FIG. 1, additional components may be present within the processor including an input/output interface 132, another interface 134, and an integrated memory controller 136. As seen, each of these components may be powered by another integrated voltage regulator $125x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. In various embodiments, PCU 138 may include logic to perform adaptive local LLC power control in accordance with an embodiment of the present invention. Furthermore, PCU 138 may be coupled via a dedicated interface to external voltage regulator 160. In this way, PCU 138 can instruct the voltage regulator to provide a requested regulated voltage to the processor. As will be described herein, in some embodiments, PCU 138 may further be involved in thread scheduling and/or migration to optimally balance performance, power, and thermal considerations.

While not shown for ease of illustration, understand that additional components may be present within processor 100 such as uncore logic, and other components such as internal memories, e.g., an embedded dynamic random access memory (eDRAM), and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the power savings realized by local LLC power control and optimal scheduling described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth). When all cores of a multicore processor are in a core low power state, the processor can be placed in a package low power state, such as a package C6 low power state. This package low power state is a deeper low power state than a core C6 state, since additional processor circuitry can be turned off such as certain clock generation circuitry including phase locked loops (PLLs).

Figure 2:
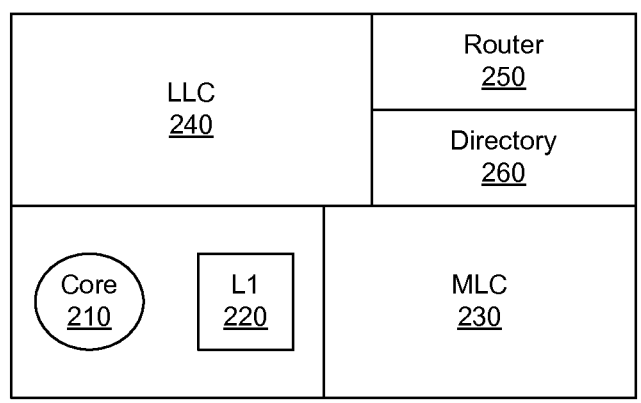
FIG. 2 is a block diagram of a tile of a multi-tile chip multiprocessor in accordance with an embodiment of the present invention.

Referring now to FIG. 2, shown is a block diagram of a cluster or tile of a CMP in accordance with an embodiment of the present invention. As shown in FIG. 2, tile 200 includes various components that may be replicated across each tile or cluster of the CMP to provide multi-processing capabilities. In the embodiment of FIG. 2, tile 200 includes a core 210 which in different embodiments may be an in-order core or an out-of-order core. Or course, given tiles may include more than one core. In one embodiment, core 210 may have a micro-architecture including processor logic and circuits used to implement an instruction set architecture (ISA). Accordingly, processors with different micro-architectures can share at least a portion of a common instruction set. For example, Intel® Pentium 4 processors, Intel® Core™, and Intel® Atom™ processors from Intel Corp. of Santa Clara, Calif., and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a register alias table (RAT), a reorder buffer (ROB) and a retirement register file). In one embodiment, registers may include one or more registers, register architectures, register files, or other register sets that may or may not be addressable by a software programmer.

Core 210 may couple to a first level cache 220 that may be a relatively small cache memory closely associated with the core. In turn, cache 220 is coupled to a mid-level cache (MLC) 230 that may include greater storage capacity. In turn, MLC 230 is coupled to a further portion of a cache hierarchy, namely a last level cache (LLC) 240 that may include even greater amounts of storage capacity. In some embodiments, this cache hierarchy formed of cache 220, MLC 230, and LLC 240 may be an inclusive cache hierarchy such that all of the information stored in cache 220 is present in cache 230, and all of the information stored in cache 230 is present in LLC 240. Of course, when LLC 240 is power gated when the core is active, the hierarchy is non-inclusive.

Also understand that this tile-included cache hierarchy includes slices or portions of a shared cache implemented with LLC 240 of a larger cache memory structure. In other words, the LLC may be a portion of a larger cache structure of the level distributed access the tiles. In addition, tile 200 includes a router 250 and a directory 260. In general, router 250 may be used to route communications to and from other components of the CMP such as one or more other tiles and/or other agents of the processor. In turn, directory 260 may be part of a distributed directory protocol to enable cache coherent operation within the system. Although shown at this high level in the embodiment of FIG. 2, understand the scope of the present invention is not limited in this regard. For example, while FIG. 2 shows a three-level cache hierarchy understand the scope of the present invention is not limited in this regard, and in different embodiments a two-level cache hierarchy (or a hierarchy having greater than three levels) may be provided. Also, while embodiments described herein are with regard to power control of a LLC, in an implementation having a different number of levels instead another cache level may be controlled as described herein.

Figure 3:
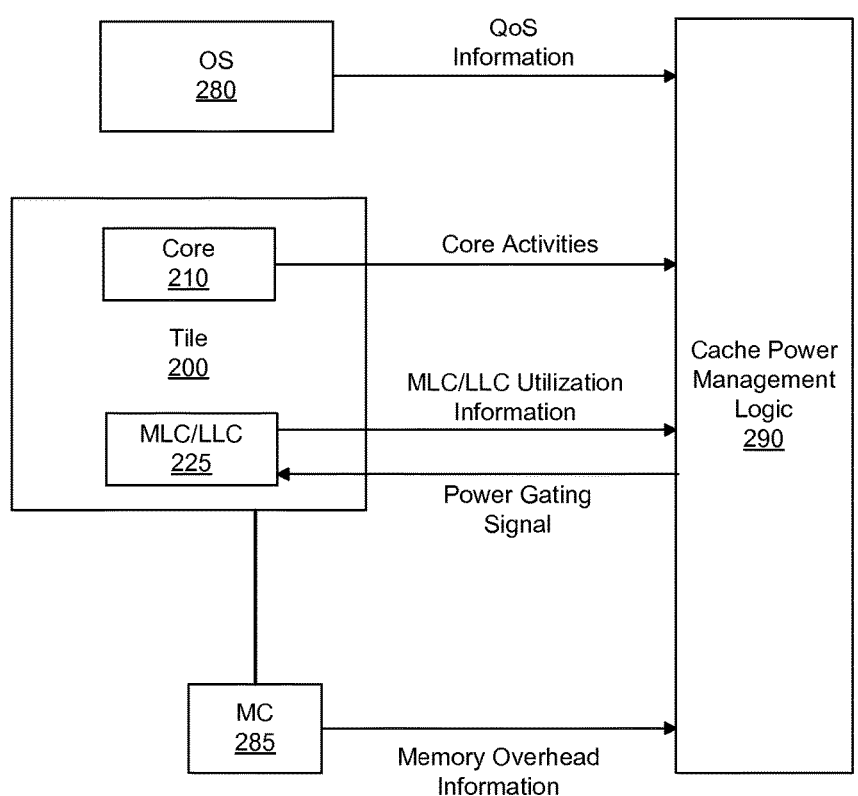
FIG. 3 is a high level architecture block diagram of components involved in performing adaptive local cache power management in accordance with an embodiment of the present invention.

Referring now to FIG. 3, shown is a high level architecture block diagram of components involved in performing adaptive local cache power management in accordance with an embodiment of the present invention. As shown in FIG. 3, circuit 275 includes various components that provide information regarding processor activities to a cache power management logic 290 that in turn generates a decision as to power control of an LLC. In an embodiment, logic 290 may be of a PCU of the processor, or it may be an independent control logic. As seen, a tile 200 includes a core 210 and a cache hierarchy 225 including an MLC and an LLC. Note that the low level cache of the cache hierarchy may be included as part of core 210. In addition, understand that the MLC and LLC may be separate such that responsive to the various inputs received, logic 290 can send a decision to cause the LLC portion of the cache hierarchy to be power gated, based on performance metrics and other conditions.

As further seen in FIG. 3, an OS 280 provides quality of service (QoS) information to logic 290. Also, a memory controller 285, which may be an integrated memory controller of a processor package provides certain information, including memory overhead information, details of which will be discussed further below. Logic 290 also receives various performance metric information from tile 200. This information can include core activity information received from core 210 and utilization information regarding the cache hierarchy, including miss information from the MLC. Based on all this information, logic 290 may make a control decision with regard to the LLC and provide that decision to cache hierarchy 225.

If the decision is to power gate the LLC, the information stored in the LLC can be flushed, e.g., to another cache hierarchy of another tile, another storage within the processor package such as an eDRAM or other internal storage. Or the information can be flushed to a system memory, via memory controller 285. Although shown at this high level in the embodiment of FIG. 3, understand the scope of the present invention is not limited in this regard.

Note that embodiments also apply to other processor architectures such as a clustered cache organization, e.g., a cluster on die, where the unit of LLC power management is a cluster of LLC slices instead of one individual LLC slice. Throughout this discussion, the terms "core" and "a cluster of cores" are used interchangeably.

To determine whether power savings via LLC power gating are possible, embodiments may continuously monitor core activity and cache behavior to detect certain scenarios. In an embodiment, two different scenarios may be detected. First, when a core is to be placed into a certain low power state (e.g., entering a C6 state), potentially its LLC can be flushed and turned off to save power. To determine whether a power savings is possible, one or more run-time conditions such as certain performance metrics may be analyzed to make an intelligent decision on whether an upcoming idle duration can amortize the cost of flushing and turning off the LLC slice. Second, for a core that is in an active state, other performance metrics can be analyzed such as misses being sent out of a MLC. If the number of misses generated by the MLC within a period of time is less than a threshold, the LLC may be flushed and power gated, as this is an indication that the MLC has sufficient cache capacity to handle a given workload.

In an embodiment, the run-time conditions to be analyzed include the workload characteristics, number of ways that are enabled, misses of the MLC per thousand instructions (MPKI), and upcoming idle duration estimation. In some embodiments, QoS requirements of an OS/application also may be considered, since power gating the LLC introduces a longer resume latency (e.g., due to loading the data from system memory). Note that in some embodiments, this delay can be mitigated by storing data in other under-utilized LLC slices or in another memory such as an eDRAM.

Embodiments may make a determination as to whether to flush and power gate a LLC slice when a core enters a low power state since flushing/reloading cache contents and entering/exiting a given low power state have certain overhead associated with the actions. Thus, it can be determined whether the LLC slice is to stay in the low power state for at least a minimum amount of time, referred to herein as an energy break even time (EBET), to compensate for the energy overhead for the transitions (in and out). Moreover, flushing a cache slice and entering a low power state may also create a small amount of delay when the core wakes up, and thus may impact responsiveness and performance. As such, embodiments may only flush and turn off a LLC slice when the expected idle duration is long enough to amortize the overhead (as measured by the EBET), and also when a certain performance level is maintained.

Further, if the core is running, the MLC might offer sufficient cache capacity for a short period of time until the application changes its behavior. Hence, this application behavior may also be detected such that the LLC is only flushed if the MLC provides enough capacity and a workload's memory needs are relatively stable, to prevent oscillation.

In an embodiment, EBET is defined as the minimum time for the LLC to transition into and remain in a given lower power state (including the entry and exit transition time), to compensate for the cost of entering and exiting this state from a powered on state. According to an embodiment, this EBET is based both on static and dynamic conditions, including resume and exit latency, power consumption during on, transition and off states, and dynamic run-time conditions, such as cache size used. For example, when an opened cache size is very small, the overhead of flushing and reloading the data is typically small, thus reducing the total overhead.

In one embodiment, the following factors may be considered in determining an adaptive EBET value: (1) enter and exit latency (L); (2) power during enter and exit period ($P_t$); (3) LLC on power ($P_{on}$), and LLC leakage power ($P_{off}$) when the LLC is power gated; (4) core power $P_c$ during reloading time, and memory related power $P_m$ during flushing and reloading time; and (5) content flushing overhead $O_f$ and content reloading overhead $O_r$, including system memory access overhead, e.g., as obtained from a memory controller. This total overhead is $O=O_f+O_r$.

Flushing and reloading cache content take time, introducing overhead. How long it takes, however, depends on the workload characteristic. And the energy consumption overhead also depends on system characteristics such as memory and memory controller power consumption. The first 4 factors are design parameters that may be stored in a configuration storage of the processor, while the fifth factor depends on run time dynamics. If a given workload consumes only a small number of cache ways, the flush time and reload time will be small as well. Moreover, for a workload that does not reuse data frequently (such as a streaming application), the cache flushing and reloading cost is relatively low since new data will be loaded anyway, regardless of flushing or not. This workload determination can be measured, in an embodiment, using LLC miss rate. If the miss rate is high, the application exhibits a streaming characteristic.

After the overhead O is determined, the EBET can be calculated as follows:

$$EBET*P_{on}=O*P_{on}+L*P_t+(EBET-O-L)*P_{off}+P_c*O_r+P_m*O.$$

And it yields:

$$EBET=(O*P_{on}+P_c*O_r+P_m*O+L*P_t-(O-L)*P_{off})/(P_{on}-P_{off}).$$

In order to simplify the design, $O_f$ and $O_r$ can be replaced by a design parameter to represent the average flushing and reloading overhead. Note that an EBET value can be updated periodically and dynamically based on the workload characteristics. If the workload behavior is stable, the EBET can be updated less frequently to reduce calculation overhead; otherwise the EBET can be updated more frequently. As an example, for a relatively stable workload, the EBET value can be updated approximately every several minutes. Instead with a dynamically changing workload, the EBET value can be updated approximately every several seconds or even less.

After the break even time EBET is determined, a length of the upcoming idle duration may be compared with the EBET value to determine whether it saves energy to flush and shut down the LLC slice. QoS factors may be considered in this analysis, in an embodiment.

There are multiple techniques to obtain an estimate of the upcoming idle duration. One exemplary technique includes an auto demotion method in which a controller observes a few idle durations in the near past. If these durations are smaller than the adaptive EBET when the LLC was flushed, then the controller automatically demotes the processor to a low power state (such as a core C4 state) in which the cache is not power gated.

Another exemplary technique to estimate upcoming idle duration includes using one or more device idle duration reports and other heuristics. These device idle duration reports may be received from devices coupled to the processor such as one or more peripheral or IO devices. Based on this information and heuristic information, the next idle duration can be predicted, e.g., by a control logic. Or a control logic can predict the idle duration based on a recent history of instances of idle durations such as via a moving filter that tracks the trend and provides a reasonable estimation of the idle duration.

A still further exemplary technique for power management is to power gate a LLC based on a measurement of MLC utilization to determine whether the LLC is needed or not. That is, if the MLC fulfills a workload's memory needs, the number of misses generated for a given number of instructions should be very little. Hence, in order to measure MLC performance, a metric can be monitored, such as the number of misses in the MLC per thousand instructions (MPKI), which can be obtained from one or more counters associated with the LLC. If this metric (or another appropriate metric) is consistently below a given threshold (e.g., a th_MPKI) for an evaluation period of time that is more than the EBET, then a determination may be made to flush and power gate the LLC. Note that this threshold may be a value above zero. That is, even if MLC is generating misses, but the misses are generated at a very slow pace, it may be more beneficial to power gate the LLC and let those misses be serviced by a further portion of a memory hierarchy instead of keeping the LLC consuming on and leakage power to service such a slow request rate. In some embodiments, this threshold (th_MPKI) may depend on the LLC leakage and the dynamic power difference between fetching data from the LLC as compared to fetching data from memory.

Next, a decision may be made as to whether an LLC slice should be power gated when an associated core or cluster of cores enters into a given low power state. Independently, MLC utilization may be monitored to determine whether the LLC can be power gated even when the core is running.

In an embodiment, QoS information may be considered to prevent too frequent deep low power entries to avoid a performance impact. QoS information can be conveyed in different manners. For example, the QoS information may indicate whether the processor is allowed to enter a given low power state and/or by a QoS budget that defines how many deep low power state entries can take place in a unit of time. In another embodiment, QoS information can also be obtained from an energy performance bias value to indicate a high level direction on what type of performance/power balance a user is expecting.

Figure 4:
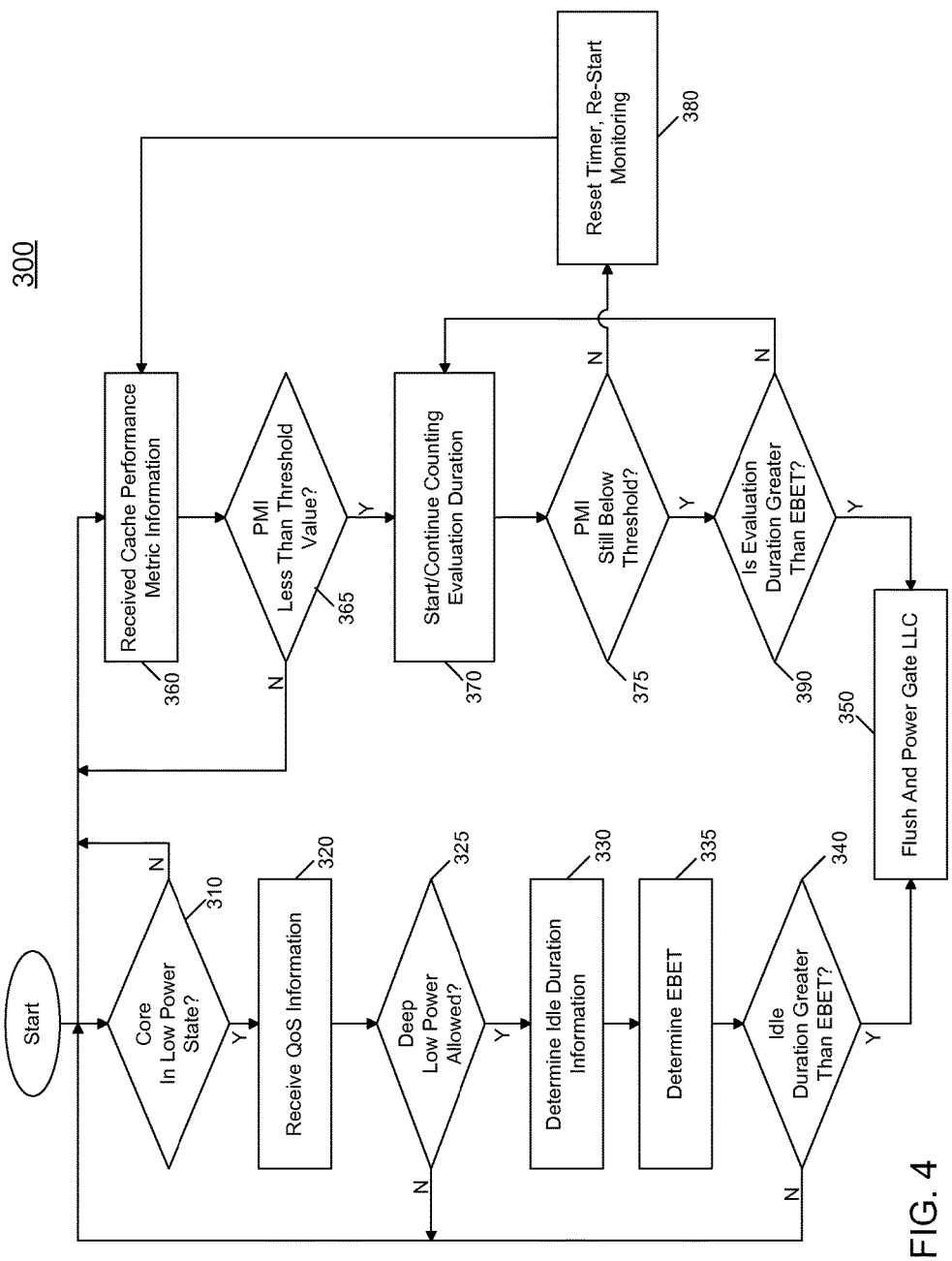
FIG. 4 is a flow diagram of a method in accordance with an embodiment of the present invention.

Referring now to FIG. 4, shown is a flow diagram of a method in accordance with an embodiment of the present invention. More specifically, method 300 can be performed by various logic of a processor. As an example, at least portions of method 300 can be performed by logic of a PCU. In addition, performance monitors of a processor can further be involved in the operations performed in FIG. 4. Note that although shown as a combined method in FIG. 4 understand that in other implementations the left and right branches of method 300 may be independently performed. For example, the left branch of method 300 may be performed upon seeking entry into a deep low power state, while the right branch of method 300 may be performed during performance monitoring activities to determine whether power savings are possible during normal processor operation. Furthermore, understand that the entities that perform these different branches of method 300 may be different in some embodiments. For example, logic of a PCU may perform the operations in the left branch of method 300, while a performance monitor or other processor logic may perform the right branch operations.

As shown in FIG. 4, operations of the left branch of method 300 begin by determining whether a core or cluster of cores is entering into a deep low power state which in an embodiment may be a core C6 state (block 310). If so, control passes to block 320 where QoS information may be received. Although the scope of the present invention is not limited in this regard in an embodiment this QoS information, which may correspond to a relative priority of a workload, can be obtained from an OS or application interface. Next, control passes to diamond 325 where it can be determined whether a deeper low power state is allowed. As an example, this deeper low power state may be a core deep C6 state. If this state is not allowed, the analysis with regard to the left branch of method 300 may conclude. Otherwise if this deeper low power state is to be allowed, control passes to block 330 where idle duration information may be determined. As discussed above, this information may be determined in various manners.

Next control passes to block 335 where the EBET may be determined. Although in some embodiments this value may be dynamically calculated, it is also possible to use a cached value of this EBET for performing the analysis. As an example, a fixed EBET may be stored in a configuration storage, or a cached EBET previously calculated by the logic can be accessed.

Still referring to FIG. 4, next at diamond 340 it can be determined whether this idle duration that was obtained is greater than the EBET value. If not, no further action is taken with regard to control of the cache memory and the tile may be maintained in a given low power state, e.g., in a C6 state. Otherwise if it is determined that the idle duration is greater than the EBET value, control passes to block 330 where the LLC may be flushed and power gated to thus reduce power consumption even further. Although the scope of the present invention is not limited in this regard in an embodiment this flushing and power gating may include performing an operation to write all dirty data from the LLC to a higher level of a memory hierarchy, e.g., system memory. After this, the LLC can be power gated to thus reduce power consumption.

Referring now to the right branch of method 300, it may begin at block 360 by receiving performance metric information of a cache, e.g., of a MLC. Although the scope of the present invention is not limited in this regard, one performance metric that may be monitored is a miss rate which in an embodiment may be measured as an MPKI value. Next control passes to diamond 365 to determine whether this miss rate is less than a threshold value. In an embodiment this threshold may correspond to a threshold value of misses that indicates relatively low utilization of an LLC coupled to the MLC. If this miss value is less than this threshold value, control passes to block 370 where a counting of an evaluation duration may be performed, either from an initial value or continuing of the evaluation duration for which the miss rate is below this threshold. In an embodiment this evaluation duration is greater than the EBET value.

Next control passes to diamond 375 to determine whether the performance metric information (e.g., miss rate) remains below this threshold. If not, the timer can be reset and monitoring may begin again at block 360.

Otherwise if at diamond 375 it is determined that the miss rate remains below the threshold level, control passes to diamond 390 where it can be determined whether the evaluation duration is greater than the EBET value. If not, control proceeds back to block 370 for further counting of an evaluation duration. If instead it is determined that the evaluation duration is greater than the EBET value, control passes to block 350, discussed above, where the LLC may be flushed and power gated. Although shown at this high level in the embodiment of FIG. 4, understand the scope of the present invention is not limited in this regard.

Figure 5:
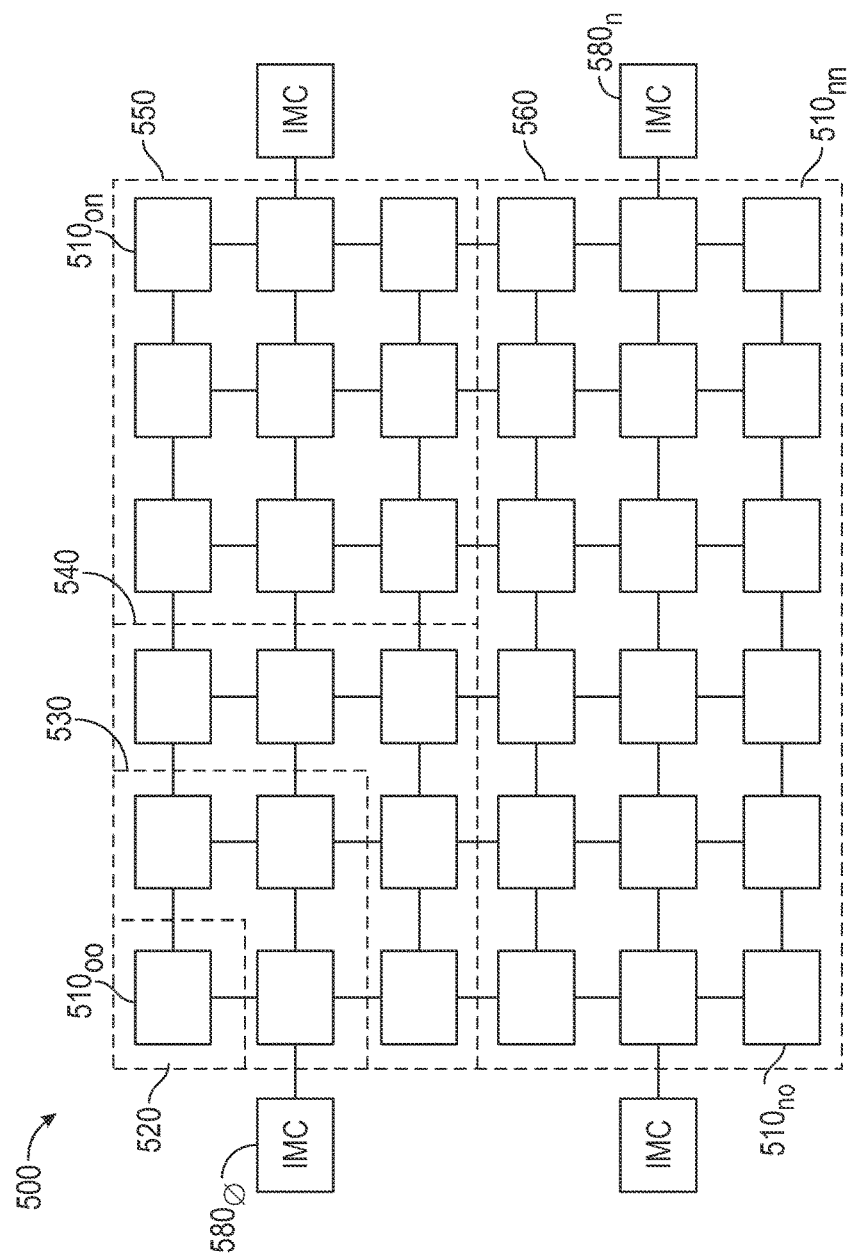
FIG. 5 is a block diagram of a portion of a processor in accordance with another embodiment of the present invention.

Referring now to FIG. 5, shown is a block diagram of a portion of a processor in accordance with another embodiment of the present invention. The portion of processor 500 shown includes a plurality of cores $510_{00}$-$510_{nn}$. In the example shown, 36 representative cores are present. However understand that more or fewer cores may be present in a particular embodiment. Furthermore, understand that different and dynamic clustering of one or more cores to be associated with different portions or clusters of an LLC are possible. In the example shown, core $510_{00}$ is illustrated as being associated with a cluster 520 of an LLC. Or 4 cores including core $510_{00}$ instead may be associated with a cluster 530 of the LLC. It is also possible for 9 cores including core $510_{00}$ (as an alternate example) to be associated with a cluster 540. As further illustrated, another possible cluster 550 includes 9 cores including a core $510_{0n}$. Still further, a cluster 560 of the LLC may be associated with 18 cores including cores $510_{n0}$-$510_{nn}$. Thus various clusters of the LLC may dynamically be associated with one or more cores. Alternately, a static association of one or more cores with each of a given cluster of the LLC is also possible. As further illustrated in FIG. 5, an integrated memory controller $580_0$-$580_n$ is coupled to the core arrangement.

Figure 6:
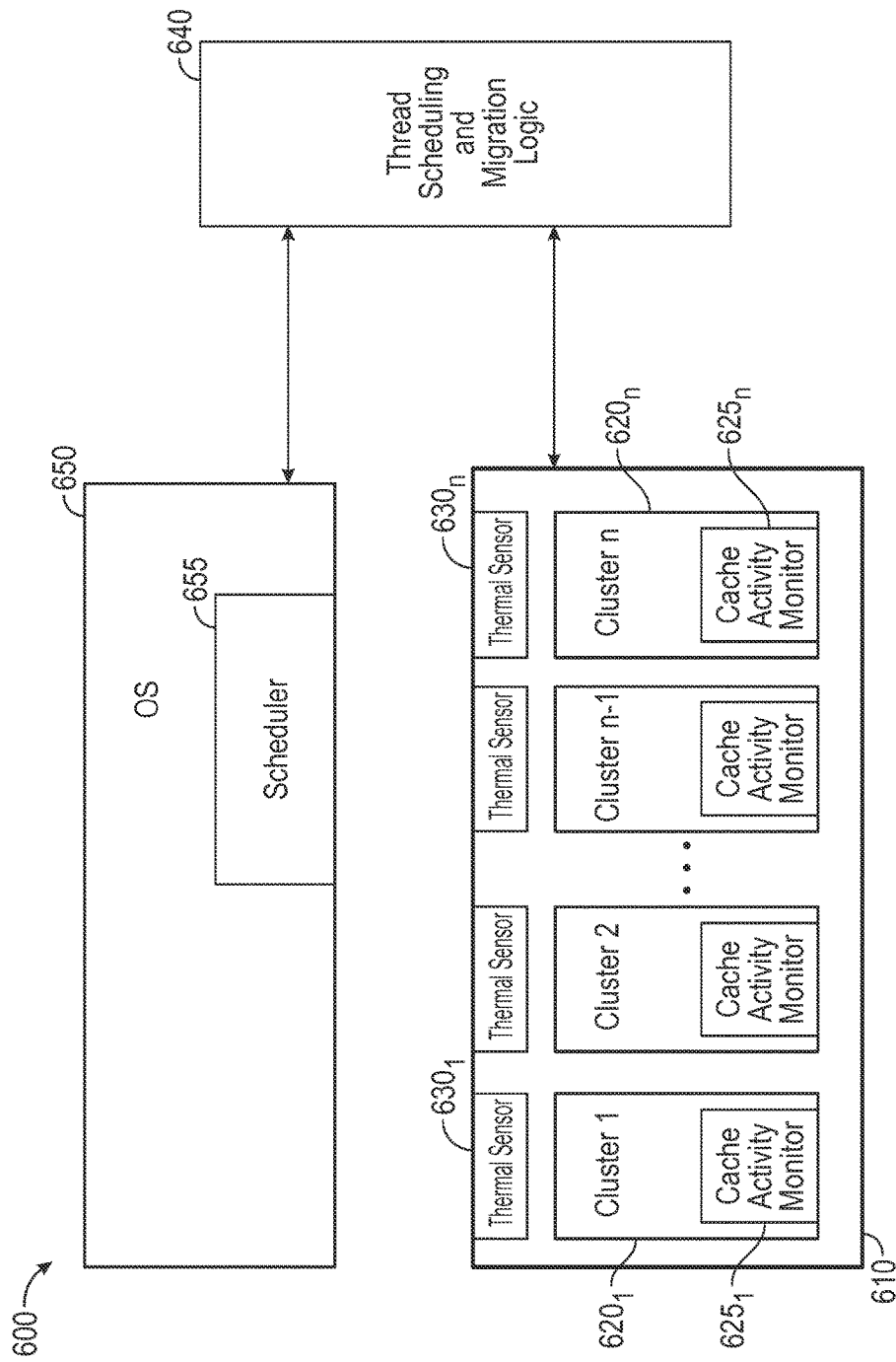
FIG. 6 is a block diagram of an architecture arrangement of a processor to perform dynamic thread scheduling and migration in accordance with another embodiment.

Referring now to FIG. 6, shown is a block diagram of an architecture arrangement of a processor to perform dynamic thread scheduling and migration in accordance with another embodiment. As seen in FIG. 6, processor 600 includes a core portion 610 (that in turn may be formed of one or more independent voltage/frequency domains) having a plurality of cores (not shown for ease of illustration in FIG. 6). Core portion 610 includes a shared cache memory formed of a plurality of clusters $620_1$-$620_n$. Each such cluster 620 may be associated with one or more cores. Understand that as described herein, the association of cores with a given cluster may change dynamically. Also, depending on the activity of the cores, one or more of the corresponding clusters 620 may be placed into a low power state to reduce power consumption as described above. As seen, each cluster 620 includes a cache activity monitor $625_1$-$625_n$. As described herein, each cache activity monitor 625 may be configured to monitor various performance metrics associated with the operation of the corresponding cluster of the shared cache memory.

As further illustrated, core portion 610 includes a plurality of thermal sensors $630_1$-$630_n$. Each of these thermal sensors 630 may be associated with a corresponding cluster 620. Understand that while in some examples, there may be a 1:1 correspondence between cluster and thermal sensor, in other examples a plurality of thermal sensors may be associated with each cluster (understand further that additional thermal sensors may be associated with other portions of processor 600 not shown for ease of illustration in FIG. 6).

As further illustrated in FIG. 6, core portion 610 is coupled to a thread scheduling and migration logic 640 (generally logic 640). Logic 640 may be configured to determine optimal cache-aware thread scheduling and migration based on performance, power and thermal considerations (among potentially other considerations). As further illustrated, an operating system (OS) 650 communicates with logic 640. As seen, OS 650 includes its own scheduler 655, which in certain implementations may initially schedule threads and/or request migration of threads between the different cores of processor 600. Note that logic 640 may be implemented as combinations of hardware, firmware and/or OS, depending on implementation, and may further be implemented as one or more microcontrollers. In a particular embodiment, logic 640 may be implemented with a PCU of the processor.

In an implementation in which OS 650 (or a hypervisor in virtualized environments) is responsible for thread scheduling and migration, logic 640 can communicate results of a thread scheduling/migration decision to OS 650 to enable it to perform the scheduling/migration task. On the other hand, if hardware is equipped with hardware scheduling/migration capability (such as logic 640 itself), the hardware can perform the task without OS involvement.

For each LLC cluster, cache activity monitor 625 monitors the cache behavior (e.g., MPKI, among other cache performance metrics). When the cache miss rate is larger than a threshold level, it is an indication that this cluster is too crowded and performance may be impacted with incorporation of more workloads. In this case, a new thread can be scheduled to another (idler) cluster. Thermal information (from thermal sensor 630) and data sharing characteristics are also considered for thread scheduling/migration.

Although the scope of the present invention is not limited in this regard, the following factors can be considered for thread scheduling/migration to avoid excessive thread consolidation and achieve optimal power, performance and thermal behavior: cache contention; thermal information; and sharing information. In addition, cache quality of service (CQoS) information may be considered. Such information generally provides fingerprint information regarding a thread's usage of cache resources. Such information may include cache occupancy by a given thread, its memory bandwidth, and/or other metrics of cache utilization by a given thread. Still further, additional information regarding the thread, such as the type of thread, its cache sensitivity or other behaviors of the thread also may be considered.

Note that in some cases, to develop such thread-based information, a thread may be initially provided with a given amount of cache space and then the thread may operate in an adaptive phase in which the thread's performance, including its performance within the cache, is determined to identify how much cache usage is consumed by the thread, its memory bandwidth, its cache sensitivity and so forth. Thereafter an enforcement phase of the thread may occur. In such phase, if it is determined that the thread does not efficiently utilize its previously allocated occupancy level (and/or bandwidth), such resources may be reduced for the thread, when it is determined that the thread is not cache sensitive (e.g., is a streaming thread).

In addition to the hardware described above, embodiments may further use performance counters such as programmable performance counters within given cores, caches and/or a performance monitoring unit of a processor to determine thread information to be used for scheduling decisions by logic 640.

Thus embodiments may leverage cache quality of service metrics (and performance counter information) to monitor cache utilization and performance. At a minimum, each cache activity monitor may be configured to maintain metrics regarding cache behavior, including LLC miss rate, which is a reflection of cache contention. In an embodiment, cache misses for each cluster are recorded by cache activity monitor 625 by using performance counters. In a particular embodiment, a programmable set of performance counters may be programmed (e.g., in each core of a given cluster) to track lower-level cache misses, which in turn can be communicated to the corresponding cache activity monitor. The observed misses for each cluster can be used to estimate the cache contention situation and potential performance impact.

As embodiments seek to limit cache contention to avoid performance degradation, cache activity monitor 625 may maintain metrics in this regard. As examples, for each cluster, MPKI or misses per cycle can be monitored and compared with a target or threshold value. If the current MPKI is much smaller (e.g., lower than a low threshold MPKI), then one or more threads can be scheduled to this cluster. If the current MPKI is larger than the threshold MPKI, meaning there might be severe cache contention, then a new thread is scheduled to another cluster or an existing thread is migrated to another cluster to mitigate the cache contention problem.

Note that for certain applications, a large miss rate does not necessarily mean a performance impact, e.g., streaming workloads typically have very large miss rate, and increasing cache size does not help their performance. In some cases, additional information such as type of thread may be considered in the determination to enable scheduling of a thread to a given cluster even when the current MPKI exceeds a threshold level. In some cases user level information or compiler-obtained information may identify a given workload as streaming. In other cases, this information may not be considered, and threads may be spread over multiple clusters, missing some power saving opportunities. However missing power saving opportunity may be tolerable, as it does not have negative performance impact.

In order to prevent thread migration oscillation, embodiments may apply a guard band to a target threshold level. In an embodiment, this guard band may be between approximately 5 to 10% of the threshold level. In such implementations, threads are only allowed to move into a cluster when MPKI is less than the target MPKI by greater than the guard band amount, while migrating a thread out of a cluster only occurs when MPKI exceeds the target MPKI by greater than the guard band amount. Instead, when the MPKI is between these levels, no thread movement action occurs.

As to thermal information, if temperature information from one or more thermal sensors associated with a cluster indicates that the cluster is close to a threshold temperature (e.g., within a guard band amount), then no more threads are scheduled/migrated into this cluster.

As to sharing characteristics, if multiple threads share significant amounts of data, embodiments may ensure that such threads are maintained in the same cluster to reduce data communication overhead. In an embodiment, sharing information may be maintained by cache activity monitor 625 and used by logic 640 in the determination of appropriate thread scheduling/migration decisions.

Also, as described herein, logic 640 may operate in an adaptive phase and an enforcement phase for a given thread. On initially scheduling the thread for execution, an adaptive phase may begin in which the thread is allocated a particular amount of cache space among other resources (e.g., memory bandwidth). Then during execution and as a result of monitoring of performance, it can be determined whether the thread is efficiently using the allocated resources. If so, during the enforcement phase the thread may continue to be granted the same level of resources (or possibly even higher levels of resources). Instead, if the thread does not efficiently use these resources, e.g., not using the allocated portions of the cache and/or memory bandwidth, logic 640 may re-allocate such resources. Still further, the limited use of resources may be taken into account by logic 640 when determining future thread scheduling/migration of one or more other threads into a cluster in which this lightly consuming thread is located.

Figure 7:
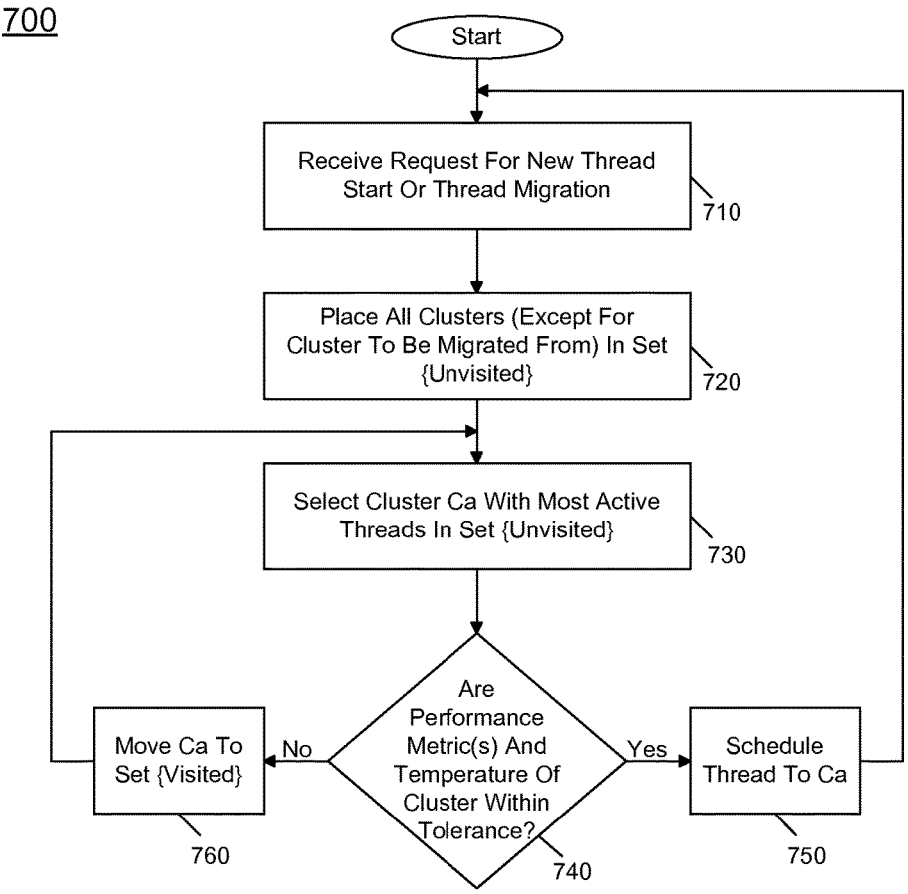
FIG. 7 is a flow diagram of a method in accordance with an embodiment of the present invention.

Referring now to FIG. 7, shown is a flow diagram of a method in accordance with an embodiment of the present invention. As shown in FIG. 7, method 700 may be performed, at least in part, by logic such as a thread scheduling and migration logic associated with a last level cache, as described herein. Such logic may be implemented by appropriate combinations of one or more hardware, software, and/or firmware, in various embodiments. Understand of course that such logic communicates with other hardware of a processor, such as cache activity monitors, thermal sensors, the cores themselves, and potentially a power controller or other components of a processor. In general, method 700 may operate to consider, on new thread start or thread migration (e.g., due to unfavorable cache performance metrics and/or temperature), the clusters sequentially until an appropriate cluster for placement of the thread is found in which power savings, performance, and thermal impact are balanced.

As illustrated in FIG. 7, method 700 begins by receiving a request for a new thread start or a thread migration (block 710). Note that these incoming requests may come from various sources. For example, an OS scheduler may request a new thread to begin execution. Or the OS may request thread migration, e.g., based on platform conditions, processor conditions or for other reasons. Still further, in embodiments in which a hardware scheduler is provided, an incoming request may be from the hardware scheduler, which initially schedules a thread to a particular core (that is associated with a given cluster). However, to confirm that this initially identified cluster is optimally situated to handle the thread, such incoming request from the hardware scheduler can be handled as a thread migration request.

Still referring to FIG. 7, next control passes to block 720 where all clusters of a shared cache memory (except for a cluster to be migrated from, in the case of a true thread migration request) may be placed into a set of clusters to be analyzed (referred to herein as an unvisited set). Thereafter a loop is performed one or more times until an appropriate cluster is identified as being able to optimally handle a workload provided or created by such thread.

As seen, the loop begins at block 730 by selecting a cluster of this unvisited set (Ca) that has the most number of active threads. Control next passes to diamond 740 where it can be determined whether one or more performance metrics and temperature of the cluster are within tolerance levels. Although the scope the present invention is not limited in this regard, in an embodiment a single performance metric (namely MPKI) may be considered by a comparison of the identified number of misses (obtained from the corresponding cache activity monitor for the cluster) to a threshold (which in an embodiment may be obtained from a configuration storage). Further, the temperature of the cluster may be obtained from one or more thermal sensors associated with the cluster and compared to a corresponding thermal threshold (also which may be stored in the configuration storage). Of course understand that in addition to this MPKI performance metric, additional performance metrics such as the above-described cache fingerprint information or other CQoS information, thread information and so forth also may be considered.

Still referring to FIG. 7, if the one or more metrics and temperature are within tolerance levels, control passes to block 750 where the thread may be scheduled to the identified cluster and accordingly, method 700 concludes for the given thread scheduling/migration. Otherwise if one or more of the metric(s) and temperature are not within tolerance, control passes to block 760 where the identified cluster may be moved to a different set, namely a visited set. Next control passes back to block 730 for further execution of the loop to determine an appropriate destination cluster. While shown at this high level in the embodiment of FIG. 7, understand that many variations are possible, and alternate analyses may be performed to determine an optimal cluster in which to insert a new thread or to migrate a thread.

Figure 8:
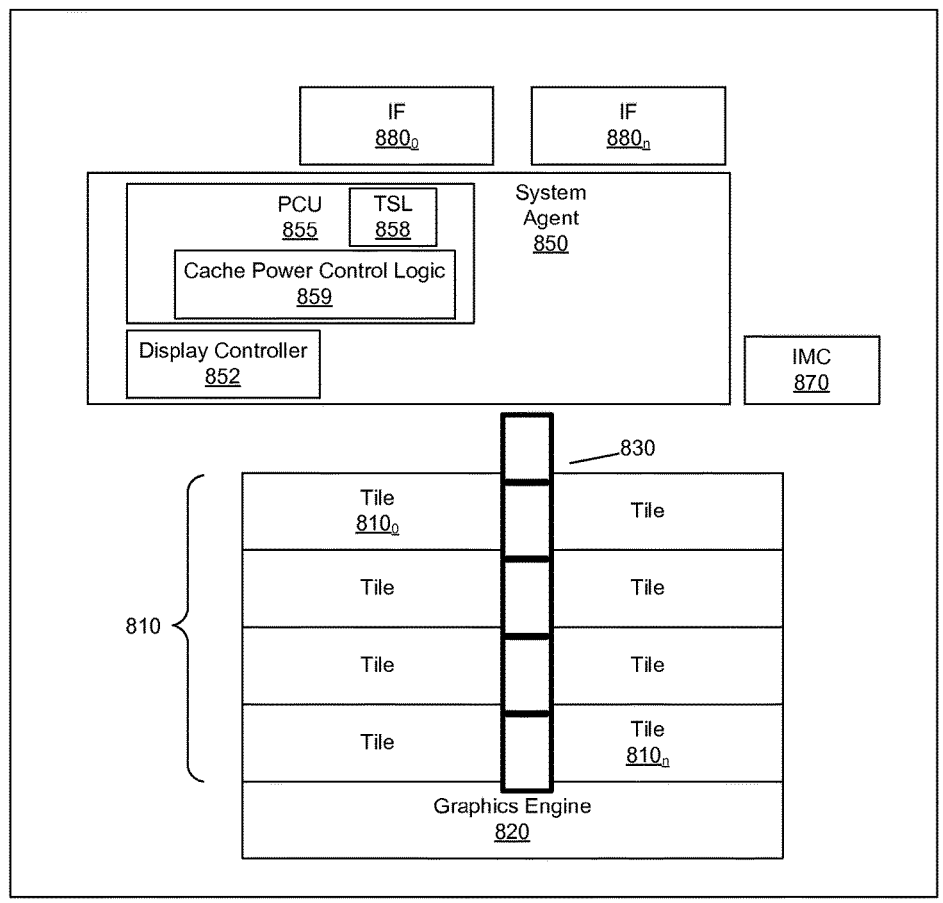
FIG. 8 is a block diagram of a multicore processor in accordance with an embodiment of the present invention.

Referring now to FIG. 8, shown is a block diagram of a multicore processor in accordance with an embodiment of the present invention. As shown in the embodiment of FIG. 8, processor 800 includes multiple domains. Specifically, a core domain 810 can include a plurality of tiles $810_0$-$810_n$, a graphics domain 820 can include one or more graphics engines, and a system agent domain 850 may further be present. In various embodiments, system agent domain 850 may handle power control events and power management such that individual units of domains 810 and 820 such as cores and/or graphics engines can be controlled to independently dynamically operate at an appropriate turbo mode frequency in light of the activity (or inactivity) occurring in the given unit. Each of domains 810 and 820 may operate at different voltage and/or power, and furthermore the individual units within the domains each may operate at an independent frequency and voltage. Note that while only shown with three domains, understand the scope of the present invention is not limited in this regard and additional domains can be present in other embodiments.

In general, each tile 810 may include a private cache hierarchy including two or more cache levels in addition to various execution units and additional processing elements. In turn, the various tiles may be coupled to each other a ring interconnect 830, which further provides interconnection between the cores, graphics domain 820 and system agent circuitry 850. In one embodiment, interconnect 830 can be part of the core domain. However in other embodiments the ring interconnect can be of its own domain.

As further seen, system agent domain 850 may include display controller 852 which may provide control of and an interface to an associated display. As further seen, system agent domain 850 may include a power control unit 855. As shown in FIG. 8, PCU 855 may include a cache power control logic 859 in accordance with an embodiment of the present invention. Based on various information received from associated tiles 810 as well as low power state decisions made within PCU 855, control logic 859 may cause an LLC or other portion of the private cache hierarchy of one or more of the tiles to be power gated to reduce power consumption when the cache slice is not needed for execution of a current workload and/or when the associated core of the tile is entering a low power state. However, at least one other tile may remain fully powered, including its LLC as a result of the private cache hierarchy present in multicore processor 800. As such, the need to maintain powered on an entirety of an LLC formed of different private cache slices can be avoided, increasing power saving opportunities. In addition, PCU 855 includes a thread scheduling logic 858, which may perform initial thread scheduling and/or thread migration to a given tile in an adaptive cache-aware manner based at least in part on cache performance metrics.

As further seen in FIG. 8, processor 800 can further include an integrated memory controller (IMC) 870 that can provide for an interface to a system memory, such as a dynamic random access memory (DRAM). Multiple interfaces $880_0\text{-}880_n$ may be present to enable interconnection between the processor and other circuitry. For example, in one embodiment at least one direct media interface (DMI) interface may be provided as well as one or more Peripheral Component Interconnect Express (PCIe™) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 8, understand the scope of the present invention is not limited in this regard.

Figure 9:
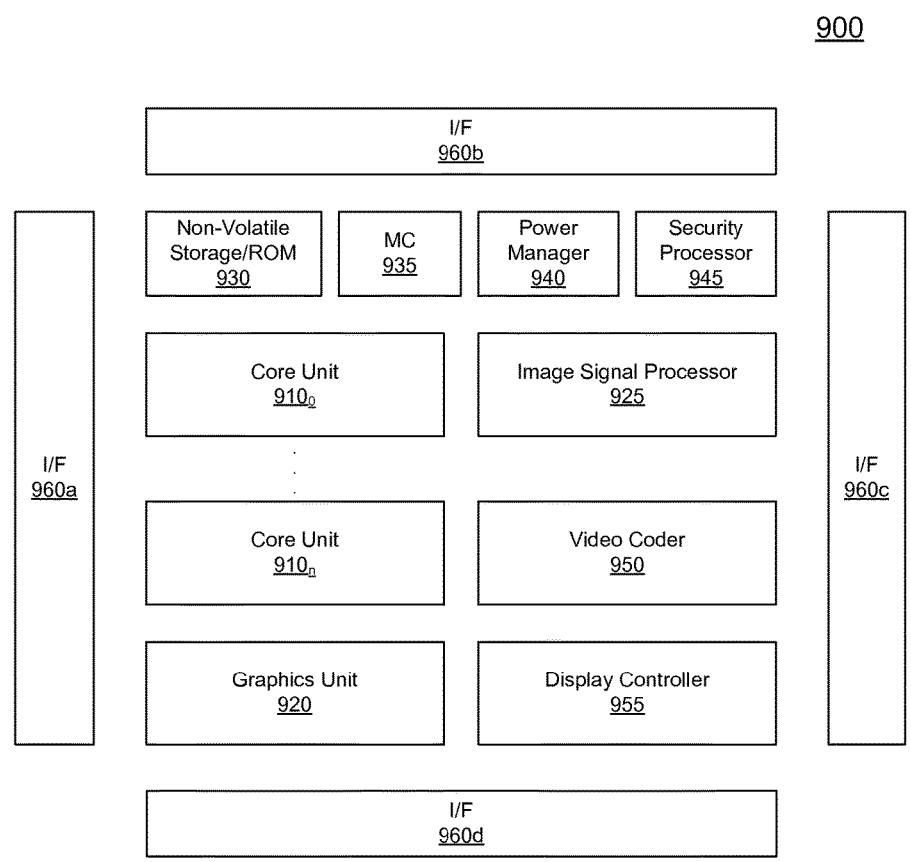
FIG. 9 is a block diagram of a processor in accordance with another embodiment of the present invention.

A processor having an LLC architecture and adaptive thread scheduling and migration operation as described herein may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0\text{-}910_n$. Each core unit may include one or more processor cores, one or more cache memories and other circuitry, and may be of the cluster-based architecture described herein. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform various power management techniques described herein. Power manager 940 may further include a thread scheduling and migration logic as described herein to perform adaptive thread scheduling and migration.

In some embodiments, SoC 900 may further include a non-coherent fabric coupled to the coherent fabric to which various peripheral devices may couple. One or more interfaces 960a-960d enable communication with one or more off-chip devices. Such communications may be according to a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
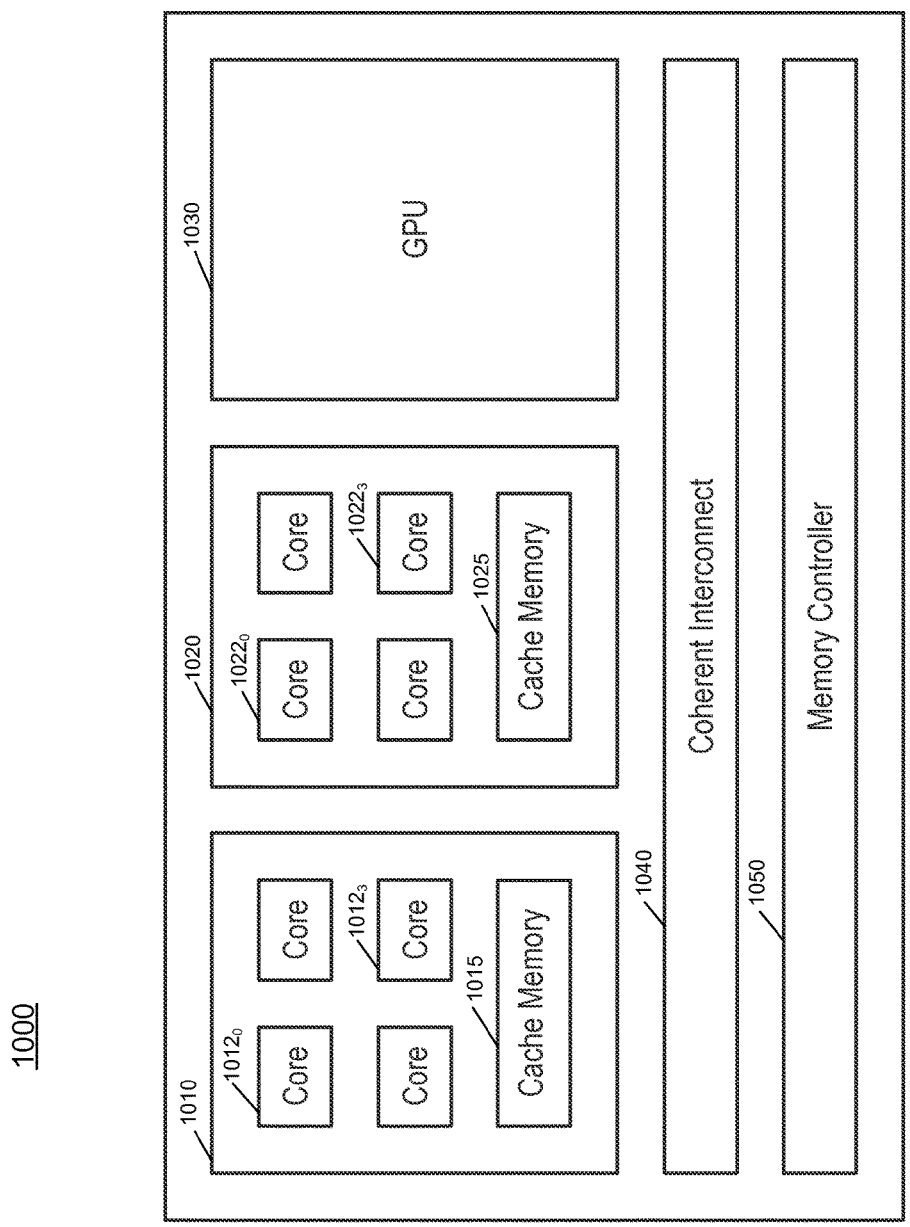
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010, which may include an LLC slice for the cores of the domain. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020, which may include an LLC slice for the cores of the domain. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
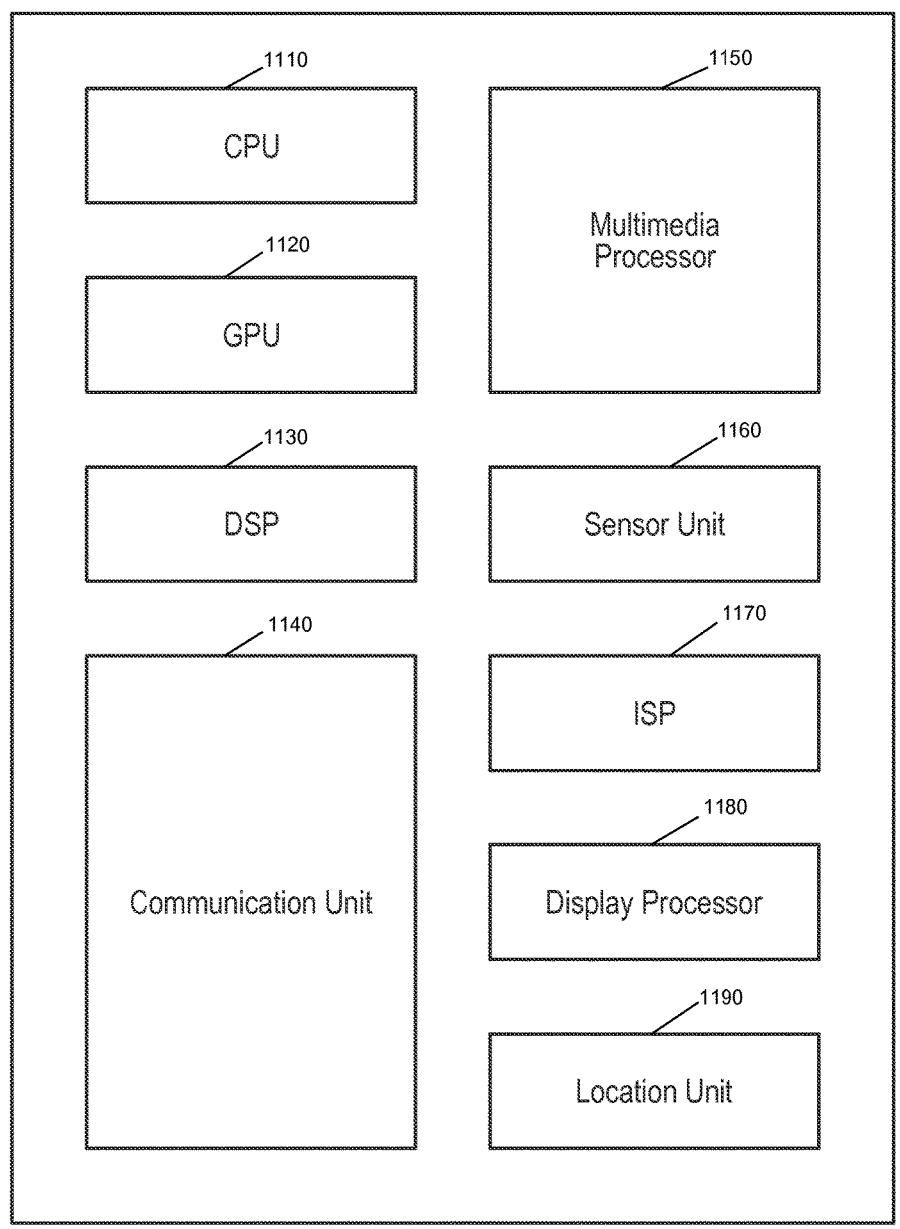
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area techniques such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
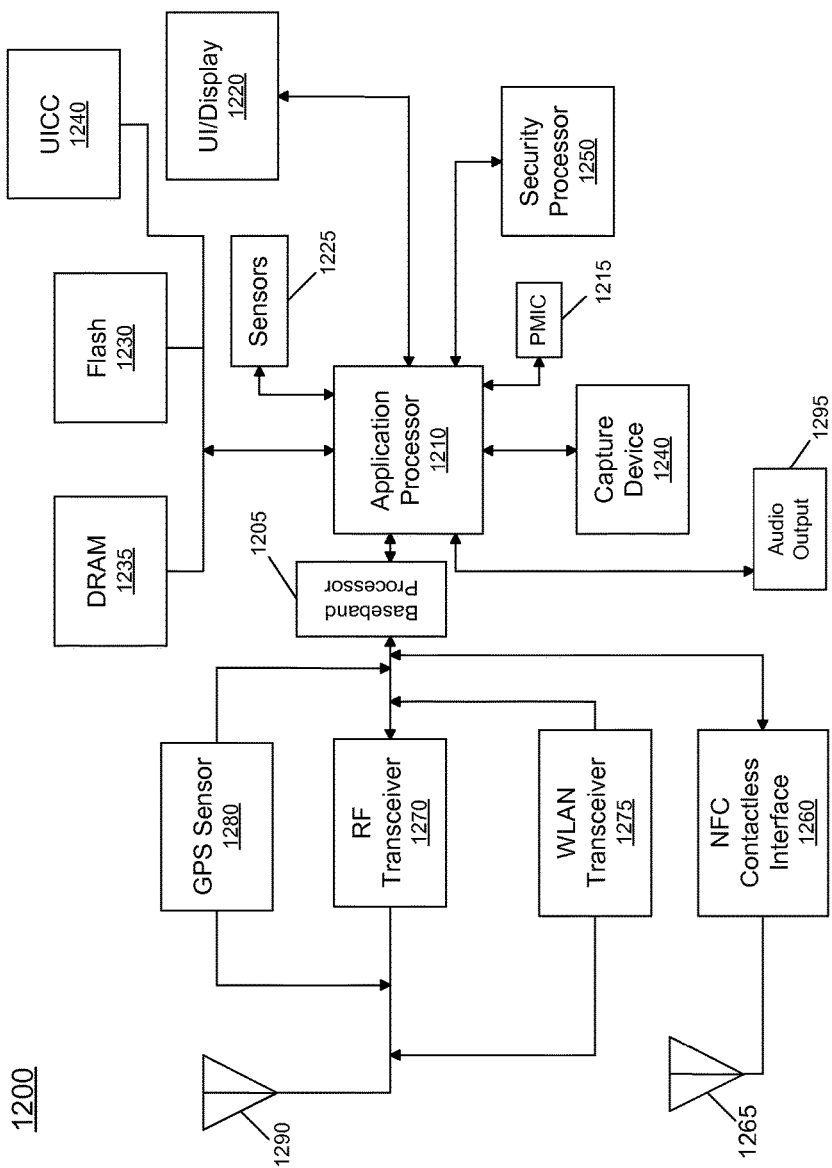
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device, and may include the cluster-aware adaptive thread scheduling and migration logic described herein.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications, such as according to a Bluetooth™ standard or an IEEE 802.11 standard such as IEEE 802.11a/b/g/n can also be realized.

Figure 13:
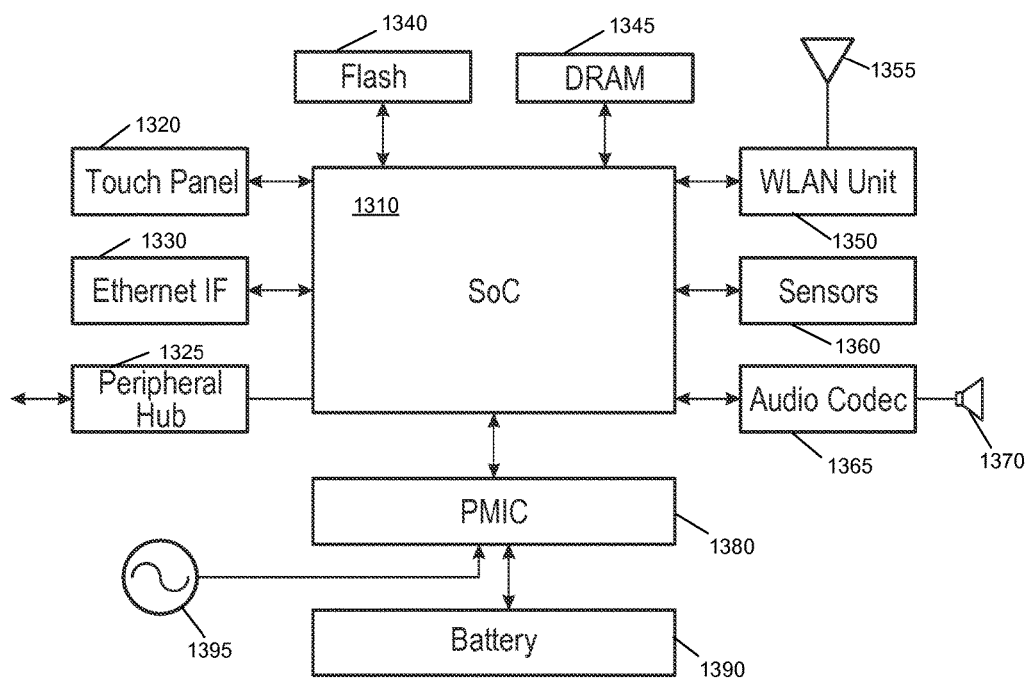
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device. SoC 1310 may have a cluster-based cache architecture and may include the cluster-aware adaptive thread scheduling and migration logic described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
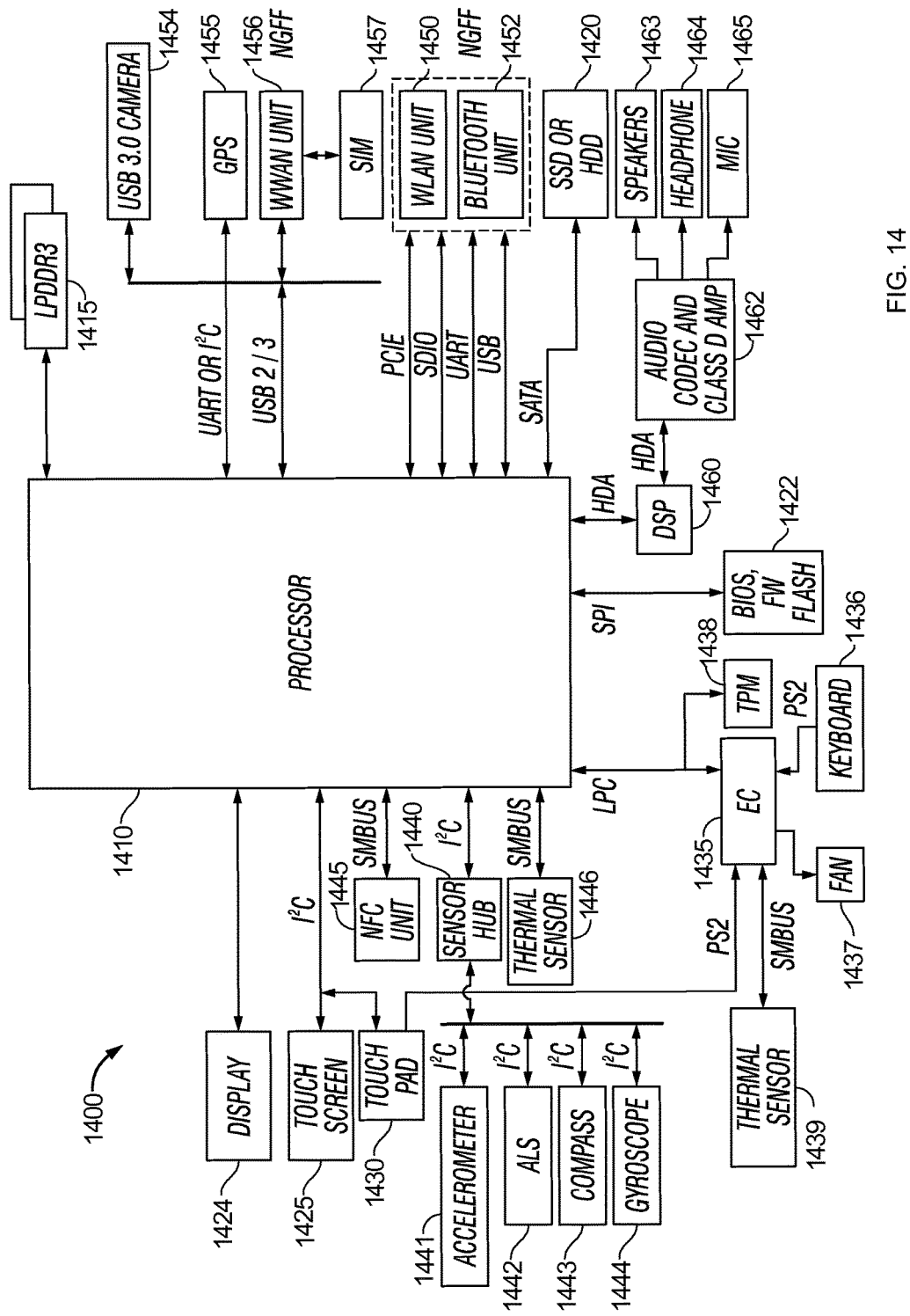
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC. Processor 1400 may have a cluster-based LLC architecture and may include the cluster-aware adaptive thread scheduling and migration logic described herein.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I²C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications in accordance with a given IEEE 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a PCIe™ protocol or another such protocol such as a serial data input/output (SDIO) standard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given USB protocol such as a USB 2.0 or 3.0 link, or a UART or I²C protocol.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
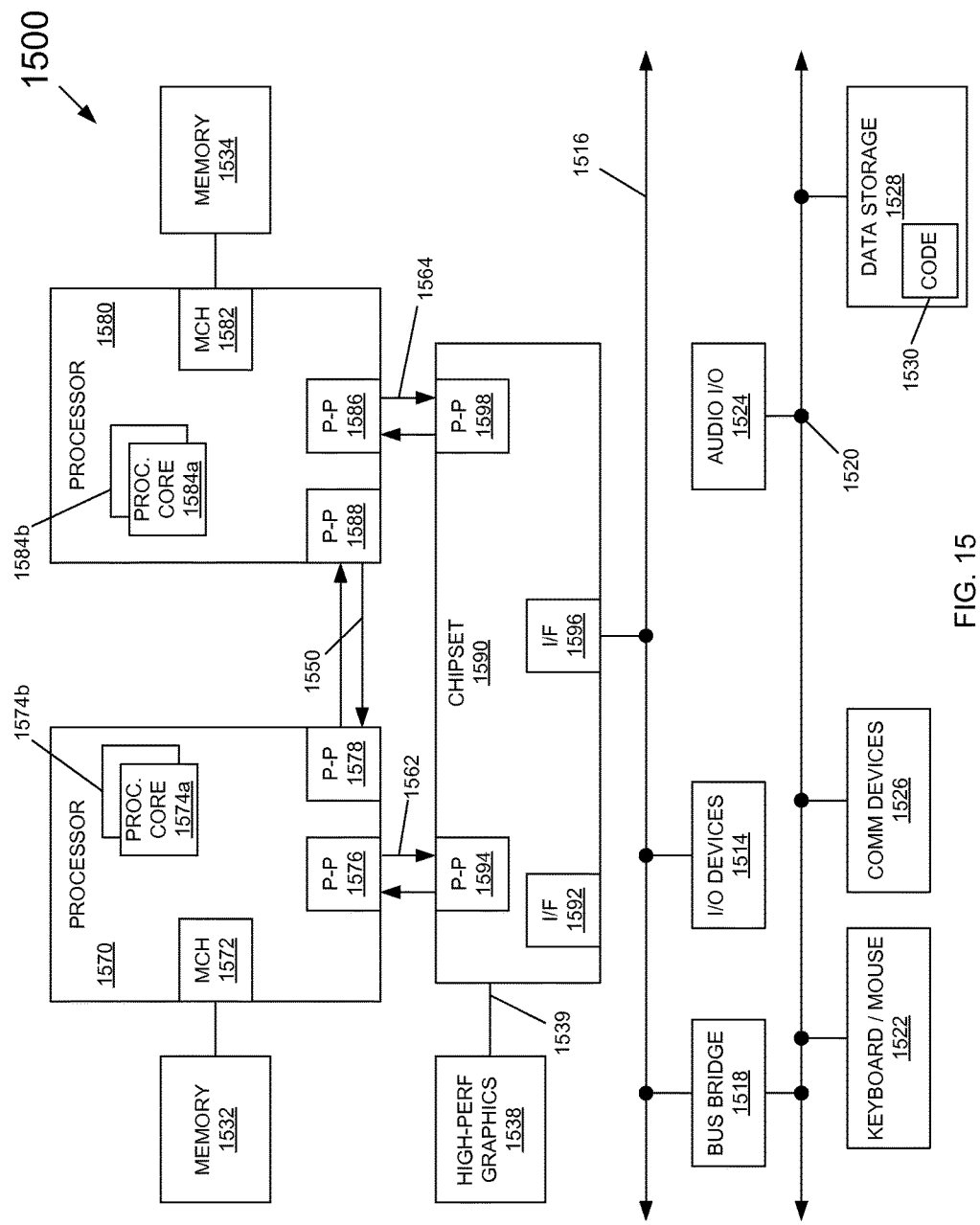
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors may have a cluster-based LLC architecture and can include a PCU or other power management logic to perform processor-based power management and cluster-aware thread scheduling and migration as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

The following examples pertain to further embodiments.

In one example, a processor comprises: a plurality of cores each to independently execute instructions; a shared cache memory coupled to the plurality of cores, the shared cache memory having a plurality of clusters each associated with one or more of the plurality of cores; a plurality of cache activity monitors each associated with one of the plurality of clusters, where each cache activity monitor is to monitor one or more performance metrics of the corresponding cluster and to output cache metric information; a plurality of thermal sensors each associated with one of the plurality of clusters and to output thermal information; and a logic coupled to the plurality of cores to receive the cache metric information from the plurality of cache activity monitors and the thermal information and to schedule one or more threads to a selected core based at least in part on the cache metric information and the thermal information for the cluster associated with the selected core.

In an example, the logic is further to migrate a first thread from a first core to a second core, based at least in part on the cache metric information and the thermal information for a first cluster associated with the first core.

In an example, the processor further comprises a configuration storage to store a first threshold performance metric for a first performance metric, a threshold thermal value, and a guard band value for the first performance metric.

In an example, the logic is optionally to schedule a first thread to the selected core when the cache metric information for a first cluster associated with the selected core is greater than the first threshold performance metric, where the first thread comprises a streaming thread.

In an example, the logic is optionally to schedule the one or more threads to the selected core when the cache metric information for a first cluster associated with the selected core is less than the first threshold performance metric and the thermal information for the first cluster is less than the threshold thermal value.

In an example, the logic is to maintain a first thread on a first core when the cache metric information for a first cluster associated with the first core exceeds the first threshold performance metric by less than the guard band value.

In an example, the logic is to migrate the first thread from the first core when the cache metric information exceeds the first threshold performance metric by greater than the guard band value.

In an example, the logic is further to schedule the one or more threads based on sharing information regarding at least one active thread.

In an example, the cache metric information includes one or more of cache quality of service information, cache occupancy information and memory bandwidth information.

In an example, the processor comprises a plurality of performance counters to maintain the cache occupancy information and the memory bandwidth information.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: receiving a thread identifier and first thread information for a first thread to be scheduled to a core of a multicore processor; selecting a cluster of a plurality of clusters of a shared cache memory of the multicore processor having a largest number of active threads; and causing the first thread to be scheduled to a core associated with the selected cluster based at least in part on one or more cache performance metrics of the selected cluster and a temperature of the selected cluster.

In an example, the method further comprises instead causing the first thread to be scheduled to another cluster based on comparison of the one or more cache performance metrics of the selected cluster to corresponding threshold levels.

In an example, the method further comprises instead causing the first thread to be scheduled to another cluster if the temperature of the selected cluster is greater than a threshold temperature.

In an example, the method optionally further comprises: receiving a request to migrate a second thread that is executing on a core of the selected cluster; selecting a target cluster of the plurality of clusters other than the selected cluster having a largest number of active threads; and causing the second thread to be scheduled to a target core associated with the selected target cluster based at least in part on one or more cache performance metrics of the selected target cluster and a temperature of the selected target cluster.

In another example, a computer readable medium including instructions is to perform the method of any of the above examples.

In another example, an apparatus comprises means for performing the method of any one of the above examples.

In yet another example, a system comprises a multicore processor having a plurality of tiles, each tile including a core and a tile cache hierarchy, the tile cache hierarchy including a first level cache, a MLC and a LLC, where each of the first level cache, the MLC and the LLC are private to the tile, a cache power controller to receive performance metric information regarding the tile cache hierarchy of a first tile of the plurality of tiles and to cause the LLC of the first tile to be power gated based at least in part on the performance metric information while the core, the first level cache and the MLC of the first tile remain in an active state, and a thread scheduler to receive the performance metric information, thermal information for the LLC and thread information of a first thread, and based thereon to schedule the first thread to the first tile. The system may further include a DRAM coupled to the multicore processor.

In an example, the thread scheduler optionally is further to migrate the first thread from the first tile to a second tile, based at least in part on the performance metric information regarding the tile cache hierarchy of the first tile and the thermal information for the LLC of the first tile.

In an example, the tile cache hierarchy of the first tile includes a first cache activity monitor to monitor one or more performance metrics of the tile cache hierarchy and to provide the performance metric information regarding the tile cache hierarchy of the first tile to the thread scheduler.

In an example, the thread scheduler is to schedule one or more threads to the first tile when the performance metric information regarding the tile cache hierarchy of the first tile includes a first metric having a value less than a first threshold performance metric and the thermal information for the LLC of the first tile is less than a threshold thermal value.

In an example, the processor optionally includes a configuration storage to store the first threshold performance metric and the threshold thermal value.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    a plurality of cores each to independently execute instructions, the plurality of cores included on a single die of the processor;
    a shared cache memory coupled to the plurality of cores, the shared cache memory having a plurality of cache portions, wherein the shared cache memory is a single memory structure included on the single die of the processor, wherein a first cache portion of the shared cache memory is associated with a first core of the plurality of cores, wherein a second cache portion of the shared cache memory is associated with a second core of the plurality of cores;
    a plurality of cache activity monitors each associated with one of the plurality of cache portions of the shared cache memory, wherein each cache activity monitor is to monitor a cache miss rate of an associated cache portion and to output cache miss rate information;
    a plurality of thermal sensors each associated with one of the plurality of cache portions and to output thermal information including a temperature of the corresponding cache portion; and
    a logic coupled to the plurality of cores to:
        receive the cache miss rate information from the plurality of cache activity monitors and the thermal information,
        in response to a determination that the cache miss rate of the first cache portion of the shared cache memory exceeds a cache miss threshold stored in the processor, migrate a first thread from the first core associated with the first cache portion to the second core associated with the second cache portion of the shared cache memory.

2. The processor of claim 1, wherein the logic is further to migrate the first thread from the first core to the second core responsive to a determination that the temperature of the first cache portion exceeds a temperature threshold.

3. The processor of claim 1, wherein the processor further comprises a configuration storage to store the cache miss threshold, a temperature threshold, and a guard band value for the cache miss threshold.

4. The processor of claim 3, wherein the logic is to migrate the first thread to the second core when the cache miss rate of the second cache portion is less than the cache miss threshold and the temperature of the second cache portion is less than the temperature threshold.

5. The processor of claim 3, wherein the logic is to maintain the first thread on the first core when the cache miss rate of the first cache portion exceeds the cache miss threshold by less than the guard band value.

6. The processor of claim 3, wherein the logic is to migrate the first thread from the first core to the second core when the cache miss rate exceeds the cache miss threshold by at least the guard band value.

7. The processor of claim 1, wherein the logic is to maintain the first thread on the first core responsive to a determination that the cache miss rate of the first cache portion does not exceed the cache miss threshold.

8. The processor of claim 1, wherein the logic is further to schedule a third thread on the second core based on the cache miss rate of the second cache portion.

9. The processor of claim 1, wherein the first cache portion is a last level cache (LLC) for the first core.

10. The processor of claim 1, wherein the cache miss threshold is based on a leakage power of the shared cache memory.

11. The processor of claim 10, wherein the cache miss threshold is further based on a power difference between fetching data from the shared cache memory as compared to fetching data from a main memory.

12. A non-transitory machine-readable medium having stored thereon instructions, which if performed by a machine cause the machine to perform a method comprising:
    scheduling a first thread to a first core of a multicore processor;
    selecting a cache portion of a plurality of cache portions of a shared cache memory, wherein the shared cache memory is a single memory structure included in a single die of the multicore processor, wherein a first cache portion of the plurality of cache portions is associated with the first core in the multicore processor, wherein a second cache portion of the plurality of cache portions is associated with a second core in the multicore processor; and
    in response to a determination that the cache miss rate of a first cache portion of the shared cache memory exceeds a cache miss threshold stored in the multicore processor, causing the first thread to be migrated from the first core associated with the first cache portion to a second core associated with a second cache portion of the shared cache memory.

13. The non-transitory machine-readable medium of claim 12, wherein the cache miss threshold is based at least in part on a leakage power of the shared cache memory.

14. The non-transitory machine-readable medium of claim 12, wherein the method further comprises instead causing the first thread to be migrated to the second core responsive to a determination that a temperature of the first cache portion is greater than a threshold temperature.

15. The non-transitory machine-readable medium of claim 12, wherein the method further comprises:
    receiving a request to schedule a second thread on one of the plurality of cores;
    selecting a third cache portion associated with a third core having a largest number of active threads; and
    causing the second thread to be scheduled to the third core responsive to a determination that the cache miss rate of the third cached portion does not exceed the cache miss threshold.

16. A system comprising:
    a multicore processor having a plurality of tiles, each tile including a core and a tile cache hierarchy, the tile cache hierarchy including a first level cache, a mid-level cache (MLC) and a last level cache (LLC), wherein each of the first level cache, the MLC and the LLC are private to the tile, a cache power control logic to receive performance metric information regarding the tile cache hierarchy of a first tile of the plurality of tiles and to cause the LLC of the first tile to be power gated based at least in part on the performance metric information while the core, the first level cache and the MLC of the first tile remain in an active state, and a thread schedule logic to:

receive the performance metric information, and in response to a determination that a cache miss rate of the LLC in the first tile exceeds a cache miss threshold stored in the multicore processor, migrate a first thread from the first tile to a second tile; and a dynamic random access memory (DRAM) coupled to the multicore processor.

17. The system of claim 16, wherein the thread schedule logic is further to migrate the first thread from the first tile to the second tile in response to a determination that a temperature of the LLC of the first tile exceeds a temperature threshold.

18. The system of claim 16, wherein the tile cache hierarchy of the first tile includes a first cache activity monitor to monitor one or more performance metrics of the tile cache hierarchy and to provide the performance metric information regarding the tile cache hierarchy of the first tile to the thread schedule logic.

19. The system of claim 16, wherein the thread schedule logic is to schedule one or more threads to the first tile when the cache miss rate of the LLC of the first tile is less than the cache miss threshold and a temperature of the LLC of the first tile is less than a threshold thermal value.

20. The system of claim 19, further comprising a configuration storage to store the cache miss threshold and the threshold thermal value.

* * * * *